Feb. 23, 1965 H. K. PUHARICH ETAL 3,170,993
MEANS FOR AIDING HEARING BY ELECTRICAL STIMULATION
OF THE FACIAL NERVE SYSTEM
Filed Jan. 8, 1962 4 Sheets-Sheet 1
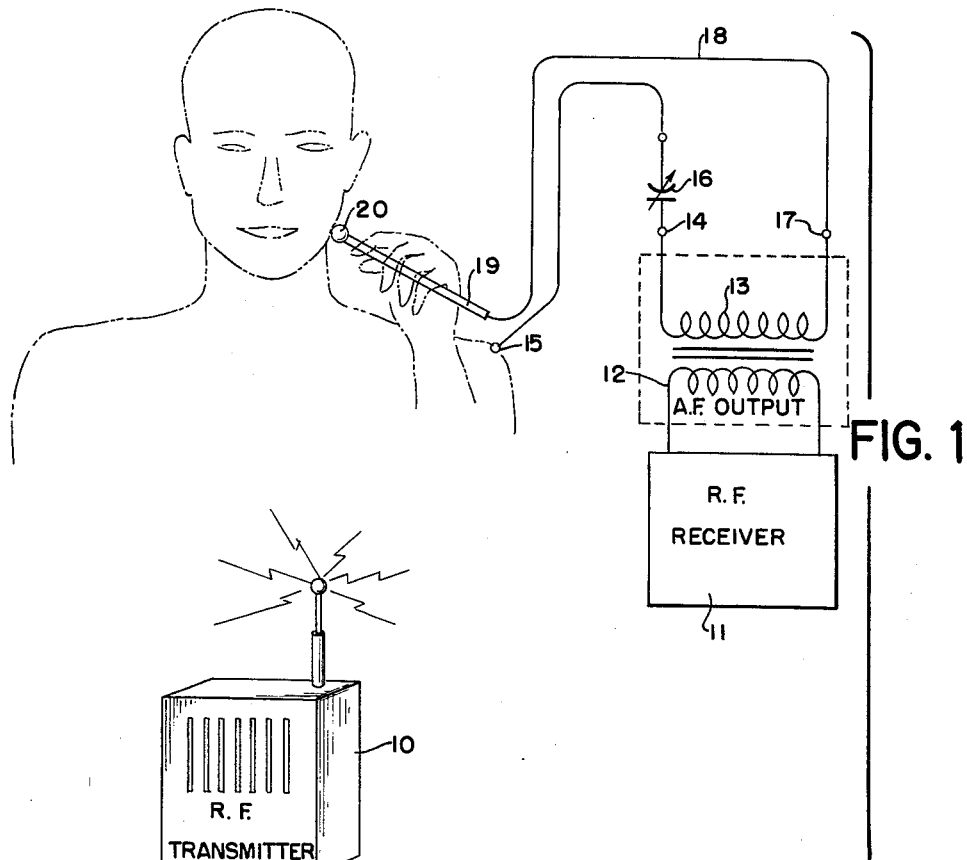
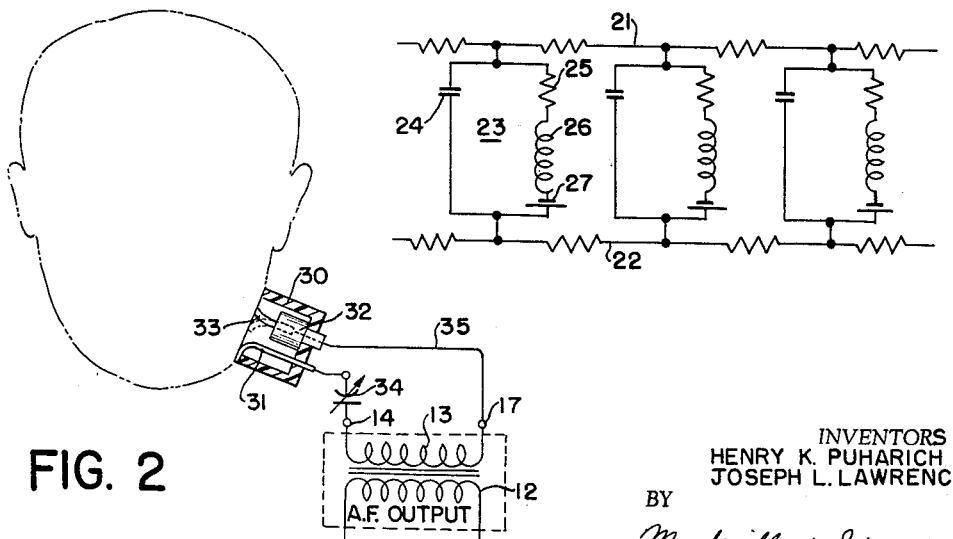
INVENTORS
HENRY K. PUHARICH
JOSEPH L. LAWRENCE
BY
Mandeville & Schweitzer
ATTORNEYS Feb. 23, 1965 H. K. PUHARICH ETAL 3,170,993
MEANS FOR AIDING HEARING BY ELECTRICAL STIMULATION
OF THE FACIAL NERVE SYSTEM
Filed Jan. 8, 1962 4 Sheets-Sheet 3

INVENTORS
HENRY K. PUHARICH
JOSEPH L. LAWRENCE
BY
Mandeville & Schweitzer
ATTORNEYS Feb. 23, 1965    H. K. PUHARICH ETAL    3,170,993
MEANS FOR AIDING HEARING BY ELECTRICAL STIMULATION
OF THE FACIAL NERVE SYSTEM
Filed Jan. 8, 1962    4 Sheets-Sheet 4
FIG. 9
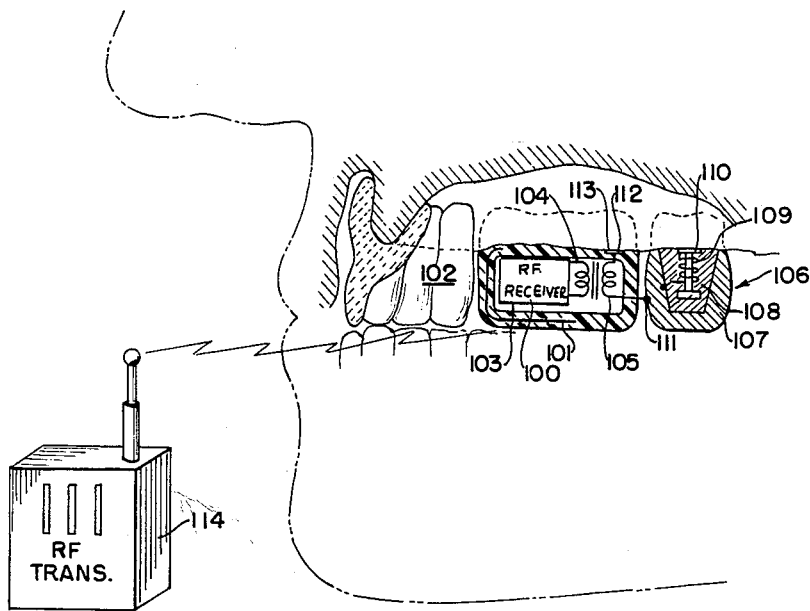
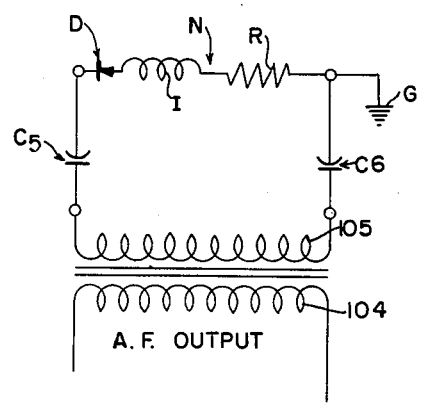
FIG. 10
A. F. OUTPUT
INVENTORS
HENRY K. PUHARICH
JOSEPH L. LAWRENCE
BY
*Mandeville & Schweitzer*
ATTORNEYS United States Patent Office 3,170,993
Patented Feb. 23, 1965

3,170,993
MEANS FOR AIDING HEARING BY ELECTRICAL STIMULATION OF THE FACIAL NERVE SYSTEM
Henry K. Puharich, 87 Hawkes Ave., Ossining, N.Y., and Joseph L. Lawrence, 570 Fort Washington Ave., New York, N.Y.
Filed Jan. 8, 1962, Ser. No. 164,882
24 Claims. (Cl. 179—107)

The present invention relates to facilities for use in conjunction with the human body for aiding hearing, and is directed more specifically to novel and improved arrangements for aiding hearing by electrical stimulation of the facial nerve system.

In our prior United States Patent No. 2,995,633, granted August 8, 1961, there is disclosed a fundamentally novel arrangement for assisting the hearing process of the human body through electrical stimulation of the facial nerve system of a user, employing modulated electrical signals corresponding to audible sounds. The basic discoveries described in our prior patent reside in the fact that the facial nerve system of the human body (the facial nerve system being a rather specifically defined nerve network, as will be described in more detail) is receptive to stimulation by electrical signals, corresponding to audible sounds, in such a way that modulated electrical signals are transmitted to produce sensations of sound equivalent to sounds received by the ear of a person having normal hearing capabilities.

Thus, in the normal hearing system of the human body, mechanisms in and associated with the ear seem to operate essentially as electromechanical transducers, converting the air pressure modulations constituting "sounds" into corresponding, modulated electrical signals, which are transmitted to hearing centers of the brain. It has been brought out by our prior discoveries, described in some detail in our prior patent, that the nerve network serving the ear mechanism is associated with the facial nerve system of the human body, which has nerve endings in the teeth and in other areas about the face and head, the association being such that modulated electrical signals of the proper type, applied to receptor nerve endings of the facial system in the teeth, bypass some of the usual mechanisms of the ear, or work in conjunction with them to produce sensations of sound which are largely indistinguishable from sensations derived through the usual hearing facilities. One of the significant consequences of the discovery resides in the fact that persons whose normal hearing mechanisms have been so damaged as to be partially or wholly unresponsive to conventional, essentially mechanical hearing aids, can be made to receive the usual sensations of sound by direct application of modulated electrical signals to the facial nerve system.

The present invention is directed specifically to the provision of improved facilities for imparting amplitude modulated electrical signals, corresponding to audible sounds, through the facial nerve system of the human body, to produce sensations of sound, with substantial fidelity and reliability. In particular, the improvement of the present invention resides in the discovery of, and the provision of means for applying in a practical way the principle of achieving especially advantageous electrical association between the facial nerve system of the body and a signal output appliance, by employing novel and improved coupling circuit arrangements.

In accordance with the invention, a novel and improved hearing aid system is provided, which includes a radio frequency receiver for receiving transmitted radio frequency signals and converting them to suitable audio modulated signals, the receiver being provided with a novel output circuit arrangement which, in conjunction with a portion of the facial nerve system to which it is coupled, constitutes a desirable and advantageous circuit. The improved arrangement is such that the audio modulated signals induced in the output circuit of the receiver are imparted to the facial nerve system in a desirable form, to which the facial nerve system is particularly receptive.

As a specific and significant aspect of the present invention, the improved audio modulated output circuit arrangement for imparting modulated electrical signals to the facial nerve system, incorporates capacitative coupling means for connecting a section of nerve "circuit" to the output of the radio frequency receiver, which supplies audio modulated electrical signals. The capacitative coupling means, in conjunction with the electrical parameters of the nerve "circuit" and the receiver output form a particularly advantageous operating circuit, which imparts to the nerve circuit the modulated output signals of the receiver in a desirable form, to which the facial nerve system has been found to be particularly responsive. As a result of the improved electrical association between the receiving appliance and the facial nerve system, the stimulations transmitted to hearing centers are of a form productive of particularly sharp and faithful sound sensations.

Although the desired capacitative coupling between the receiver output and the nerve circuit may be brought about effectively in a variety of ways, some of which will be described with particularity, the most advantageous, practical form of capacitative coupling presently known involves the use of one or more cup-shaped dental caps, which are electrically coupled to viable nerves of or normally serving the teeth, in a manner to provide an effective and desirable form of electrical capacity at each "terminal" of the nerve circuit.

The physical embodiment of the invention is capable of a substantial variety ranging from appliances adapted for application externally of the body to systems housed entirely within the oral cavity. In its most advantageous form, the means of the invention includes elements mounted on and electrically associated with one or more viable teeth of the user. However, provision is made for operatively installing an appliance according to the invention in the oral cavity of an edentulous person by incorporating the appliance within the structure of the dentures.

For a better understanding of the invention, reference should be made to the following detailed description and to the accompanying drawings, in which:

FIG. 1 is a simplified, schematic representation of an elementary form of hearing aid system according to the invention;

FIG. 2 is a simplified, schematic representation of a modification of the system shown in FIG. 1;

FIG. 4 is a schematic representation, in more detailed form, of a circuit equivalent for a nerve section, as currently theorized from experimental data;

FIG. 9 is a simplified, schematic representation of a further modified form of the invention adapted specifically for incorporation into a denture structure; and FIG. 10 is a simplified, schematic representation of a circuit equivalent of the system of FIG. 9.

Figure 5:
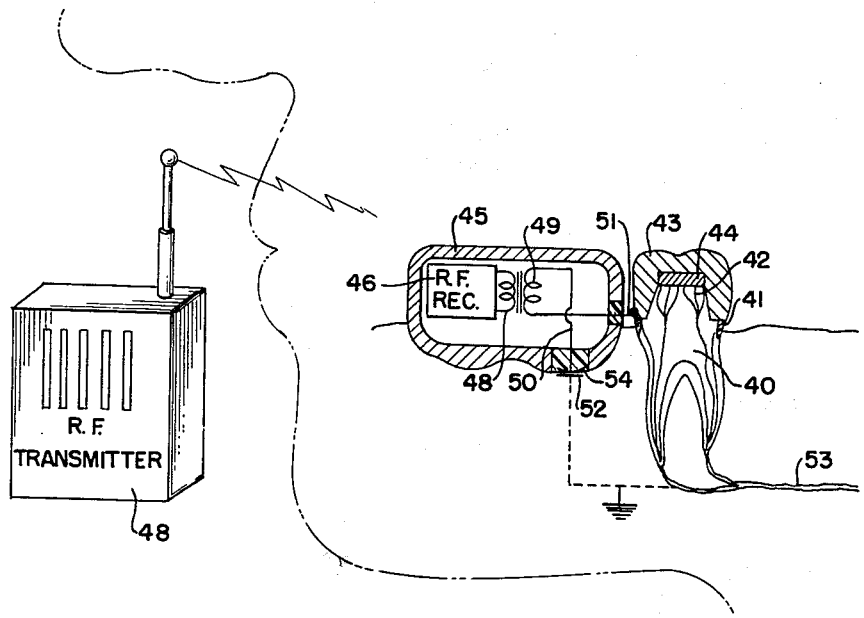
FIG. 5 is a simplified, schematic representation of a modified form of system incorporating the invention.

The invention described and claimed in our prior Patent No. 2,995,633 is based upon the fundamental discovery that the sensation of hearing can be created in the human body by electrical stimulation of nerves of the facial system, using modulated electrical signals corresponding to audible sounds. One of the basic objects of our further research, following the invention of our prior patent, was the determination with particularity of the places and manners of electrically stimulating the facial nerve system of the human body, in order to achieve optimum efficiency and fidelity of the artificially created sound sensation. This further research has led to certain additional fundamental discoveries, which are embodied in the various forms of the invention hereinafter described.

Referring initially to FIG. 1 of the drawing, there is shown a representative system, embodying the fundamental aspects of the present invention, for stimulating various sensitive areas of the facial nerve system in a manner operative to create the sensation of an audible sound in the subject. As in the system of our prior patent, an energizing signal advantageously is derived from a radio frequency transmitter 10, which desirably is placed about the body of the user or at a distance from it, and is capable of receiving audible sounds and converting them to radio frequency signals. The transmitter 10 energizes a radio frequency receiver 11 which, in turn converts the radio frequency signal to an audio modulated electrical output signal. The audio modulated output signal is impressed upon a primary transformer coil 12, constituting part of the output circuit of the receiver. A corresponding signal is impressed upon the secondary coil 13 of the transformer which forms, in effect, an isolating inductance and is an active part of the energizing circuit for the facial nerve system of the user.

In the first illustrated form of the invention, one side of the receiver output circuit, constituted by the left-hand terminal 14 of the isolating inductance is connected to any suitable point on the body of the subject, as at the point designated by the reference numeral 15. In this respect, and as one of the significant aspects of the invention, the electrical connection established between the terminal 14 and the body of the subject includes a capacitative coupling. In the illustrated, diagrammatic circuit arrangement, a variable capacitance 16 is an integral part of the body connection point 15. However, it should be understood that a physical capacitative component is not necessarily required, since our research experience establishes that the system can be operated with an air capacitance coupling, in which the body of the subject forms, in effect, one plate of the capacitor while the terminal 14 of the output circuit constitutes the other plate of the capacitor. In this respect, the human skin has pronounced dielectric characteristics, which may be taken advantage of in various ways in the practice of the present invention.

The other side of the receiver output circuit, constituted by the terminal 17 of the isolating inductance, is connected by a line 18 directly to a manual probe 19 whose active end 20, advantageously of spherical form, is electrically connected to the line 18.

In accordance with the present invention, as exemplified by the system of FIG. 1, sensations of sound corresponding to audible sounds received by the radio frequency transmitter 10 can be induced in the consciousness of the subject by applying the probe end 20 to the skin of the subject at specific sensitized areas about the head area. When the probe is applied to such sensitive areas an operative electrical circuit, including nerves of the facial system of the user, can be completed, such that the facial nerve system of the subject is electrically stimulated in accordance with the audio modulated electrical signals available at the output terminals 14, 17 of the inductance 13. When such a circuit is established, the subject receives a sensation of sound, corresponding to the audible sound imparted to the transmitter 10, substantially in accordance with the more fundamental aspects of our prior Patent No. 2,995,633.

According to our experimental observations, the system illustrated in FIG. 1 of the drawing is operative to create a sound sensation within the subject only when the probe end 20 is given a fricative motion over the sensitized area. The reason for this is not understood fully at the present time, although we have theorized that the probe end 20 establishes a capacitative coupling with the facial nerve system of the subject, and that the nerve system is activated and sensitized and made receptive to the electrical signals, by fricative, back-and-forth motion of the probe end, in a manner to effect variations in the capacity value of the coupling. But, regardless of the reason, it appears that the system of FIG. 1 is not effectively operative in the absence of fricative movement of the probe end.

As mentioned above, the system of FIG. 1 is primarily operative when the probe end 20 is applied to certain specific limited areas about the head of the subject. These specific areas appear to be highly receptive to electical stimulation in the manner contemplated by the invention, while, at least as far as we were able to discover, other areas of the body, served generally by the facial nerve system, are either insensitive to the desired electical stimulation or are capable of being sensitized only at a relatively unsatisfactory level.

Presently, we have been able to identify several principal areas, distributed over the head and innervated by the facial nerve system, which were receptive to electrical stimulation by the energized probe end 20. These areas were substantially constant from individual to individual.

No part of the body not served by the facial nerve system was found to be receptive to an electrical stimulation which produced a sensation of sound in the subject. In this respect, it is generally accepted that the facial nerve system is confined to facial areas of the body and comprises the Trigeminal or V nerve, the Facial or VII nerve, the Glosso-Pharyngeal or IX nerve, and the Autonomic nerves, together with their sympathetic and parasympathetic branches.

It is believed that the significant principle embodied in the system of FIG. 1 resides in the use of an energizing circuit including an isolating inductance 13 and capacitative couplings connecting each terminal of the isolating inductance to the facial nerve system of the subject. However, although this significant principle was further established and utilized in other forms of the invention, to be described, it is conceivable that further research may establish that the necessary fricative movement of the probe end 20 creates some condition or performs some function other than, but similar in its effective establishing a capacitative coupling, as presently theorized.

Figure 3:
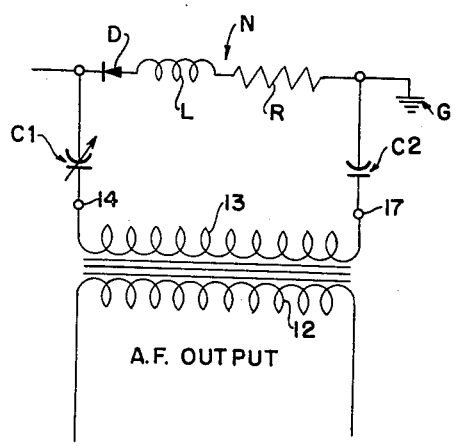
FIG. 3 is a further simplified, schematic representation of a circuit equivalent employed in the system of the invention, including a typical circuit equivalent representation for a nerve element.

Referring to FIG. 3 of the drawing, there is illustrated diagrammatically the theorized circuit arrangement of the system of FIG. 1. The theorized circuit includes the output transformer primary 12 of the receiver 11, which is energized by audio modulated electrical signals corresponding to audible sounds. The secondary coil 13 of the transformer constitutes an isolating inductance in the nerve-activating circuit, and its respective terminals 14, 17 are connected to capacitance units C1 and C2. The capacitance units are in turn coupled to a circuit unit N, representing a section of nerve of the facial nerve system of a subject. Diagrammatically, although perhaps as an oversimplification, the nerve section N may be considered to consist of elements of resistance R, inductance L, and rectification D. In addition, the nerve element N is effectively grounded to the body at G.

One of the significant and advantageous aspects of the nerve energization circuit, as represented in FIG. 3, resides in the fact that the circuit has inherent, desirable characteristics, such that the audio modulated electrical signals impressed upon the isolating inductance 13 are, through the capacitative coupling of the element C1, C2 and the inherent circuit characteristics of the nerve section N, modified and effectively impressed into the nerve circuit as desirably shaped pulses, to which the facial nerve system appears to be responsive.

In fact, the equivalent electrical characteristics of a nerve section are thought to be considerably more complex than schematically represented in FIG. 3, although the FIG. 3 representation appears to be adequately representative to explain the overall circuit operation in terms of the observations made thus far. Actually, there are several more specific theories of the circuit equivalency of a nerve fiber, one such being illustrated in FIG. 4 as derived from Medical Physics, vol. 1, page 805, issued by Yearboook Publishers, Chicago, in 1944. The equivalent circuit there illustrated comprises parallel lines 21, 22 of resistive characteristics, between which extend parallel circuits 23, each consisting of units of capacitance 24, resistance 25, inductance 26, and electromotive force 27. In fact, however, the circuit equivalency of the nerve fiber is known to be very complex, and the description and definition of the invention herein disclosed and claimed is not to be limited in any sense by a particular representation or theorization of the nerve circuit equivalency.

In FIG. 2 of the drawings, there is shown a system, substantially along the lines of the FIG. 1 system, which is adapted for fully electrical operation, realized by achieving with electromechanical means the effect of the manual, fricative motion of the probe end 20 of the FIG. 1 system. In the FIG. 2 system, there is provided a simple form of appliance, including a housing 30, a ground electrode 31 and an electromechanical element 32, typically including piezoelectrical element 33. The appliance is suitably held against the face or head of the subject, in a position such that the piezoelectrical element 33 is in physical and electrical contact with one of the established sensitive areas of the subject. The ground electrode 31 likewise is held in electrical contact with the subject, but the particular area contacted by the ground electrode 31 is not significant; typically, it is the area of the face, in view of practical limitations on the size and configuration of the housing 30.

The energizing circuit arrangement for the system of FIG. 2 includes an inductance 12, constituting the primary coil of the receiver output, and an isolating inductance 13, constituting the secondary coil of the transformer. One terminal 14 of the isolating inductance is connected through a variable capacitor 34 to the ground electrode 31, while the other terminal 17 of the inductance is connected through a line 35 to the electromechanical unit 32.

When an activating signal is applied to the isolating inductance 13, a circuit is completed through the piezoelectrical element 33, nerves of the facial system of the subject, and the ground electrode 31. The modulated signal applied to the piezoelectrical element 33 causes corresponding physical distortions of the element, in a well known manner, such that the end of the element moves rapidly relative to the skin of the subject, resulting in the desirable, fricative motion, such as derived through manual manipulation of the probe 19 in a system of FIG. 1.

In the system of FIG. 2, a capacitative coupling is established between the inductance terminal 17 and the sensitive nerve area of the subject by virtue of the inherent capacitative characteristics of the piezoelectrical element 33, and, perhaps, in part through the contact between the element and the subject's skin. The piezoelectrical element may be of a conventional type, formed of a material such as Rochelle salt, barium titanate, or the like.

In the system of FIG. 5, permanent electrical connection to the sensitive nerve endings of the facial system of the subject is established by appliances received within the oral cavity of the subject. Advantageously, a viable tooth 40 of the subject is denuded by removal of its protective enamel layer 41 to expose sensitive nerve endings 42 which terminate in the dentine structure of the tooth. A cup-shaped dental cap 43 is applied over the denuded tooth, using generally conventional dental techniques, and a small element of piezoelectric material 44 advantageously is interposed and electrically coupled between the exposed nerve endings 42 and the metal material (e.g., gold) of the cap 43. A housing 45, advantageously formed to simulate a false tooth or an adjacent pair of false teeth is mounted adjacent the capped tooth 40 and houses a radio frequency receiver 46 of microminiaturized form.

As in the case of the systems of FIGS. 1 and 2, the receiver 46 of the FIG. 5 system is provided with an output circuit including an inductance 48 forming the primary of an output transformer, upon which is impressed audio modulated signals from the receiver network. An inductance 49, constituting the secondary coil of the transformer and forming an isolating inductance in the nerve activating circuit, also is contained within the housing 45 and has output connections 50, 51 extending in insulating relation through the walls of the housing. One of the output connections is coupled directly to the conductive metal cap 43 provided on the denuded tooth 40. And, in accordance with the invention, the other output connection 50 is capacitatively coupled to the facial nerve system of the subject, advantageously by means, such as capacitative plate 54 which substantially through the gum mucosa contacts the nerve trunk 53 leading to the denuded tooth 40.

Actually, the capacitative coupling between the output connection plate 50 and the gum mucosa 52 may be a saliva coupling, rather than a direct electrical coupling using a physical capacitative component. However, an actual physical connection may be desirable for improved reliability and is illustrated to facilitate a proper understanding of the invention.

In the completed nerve-activating circuit of the FIG. 5 system, the operative section of the facial nerve is capacitatively coupled to one side of the inductance 49 by means of the capacitative element 54, while the other side of the inductance 49 is capacitatively coupled to the nerve endings 42 by means of the cup-shaped dental cap 43, which functions much like a Leyden jar, by virtue of its cup-like configuration and its generally surrounding relation to the nerve endings 42. Accordingly, when modulated, audio frequency electrical signals are impressed upon the isolating inductance 49, desirably shaped pulses are impressed upon the facial nerve system, through the cooperative relationship of the inductance 49, the capacitative couplings at each side thereof, and the inherent electrical nature of the nerve fiber itself. The applicable schematic circuit representation, at least as presently understood, is illustrated in FIG. 3.

Figure 6:
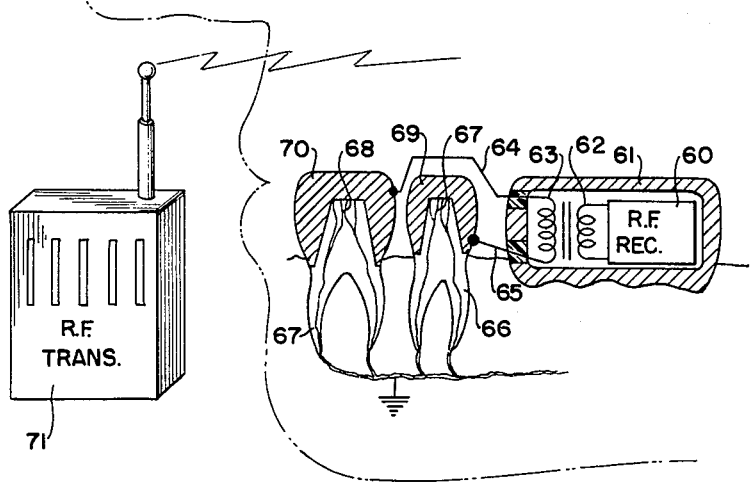

In the system of FIG. 6, a radio frequency receiver 60 is encased within a housing 61, advantageously in the form of a false tooth or a pair of adjacent false teeth. The receiver has an output circuit including an inductance 62, forming an output transformer primary, which is adapted to impress signals upon an inductance 63, constituting the secondary of the transformer. The inductance 63 has output connections 64, 65 passing in insulated relation through the walls of the housing 61 for operative connection in the nerve activating circuit to be described.

To effect the desired circuit connection to the facial nerve system, the system of FIG. 6 utilizes a pair of viable teeth 66, 67 which have been denuded of their enamel to expose sensitive nerve endings 67, 68 of the dentine and have been provided with generally conventional dental caps 69, 70 formed of a conductive material, such as gold. One of the caps 69, is connected to one side of the isolating inductance 63 by means of the output connection 65, while the other cap, 70, is connected to the other side of the inductance by means of the output connection 64 to complete a circuit.

In the system of FIG. 6, the isolating inductance 63 is capacitatively coupled in the desired manner to the operative section of the facial nerve by means of the two cup-shaped dental caps 69, 70, which, as explained in connection with the system of FIG. 5, function as Leyden jar capacitors.

Figure 8:
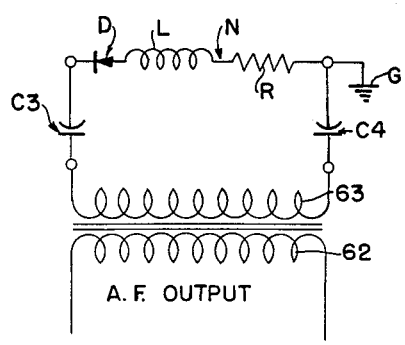
FIG. 8 is a simplified, schematic representation of the circuit equivalent for the systems of FIGS. 5–7.

A simplified, equivalent circuit representation of the system of FIG. 6 is shown in FIG. 8, which illustrates the inductance coils 62, 63 of the receiver output, capacitive elements C3, C4, representing the cap connecttions to the dental nerve system, and the active nerve section N, including equivalent circuit elements in the form of resistance R, inductance L, and rectification D, as well as body ground G.

One of the particularly unique and advantageous features of the system of FIG. 6 resides in the fact that its intra-oral receiver unit 60, which receives transmission of radio frequency signals from a transmitter 71 located on or about the body of the subject, is substantially completely shielded by the housing 61, which advantageously is formed of a conductive material. Surprisingly, the shielded receiver not only receives and faithfully converts the radio frequency transmission directed to it, but the signal-to-noise ratio of the system is found to be surprisingly and unexpectedly high. The operation of the system, in this respect, is not fully understood, although it is believed at the present time that the output connections and their associated conductive caps 69, 70 function not only in the previously described manner, but also as an antenna system for the radio frequency transmission and a filter system for the receiver output. But, whatever the reason, the experimental data derived as of the present time indicates that the system of FIG. 6 exhibits highly efficient and faithful operating characteristics in terms of creating in the subject a faithful, high fidelity sensation of the audible sound actually energizing the system.

Figure 7:
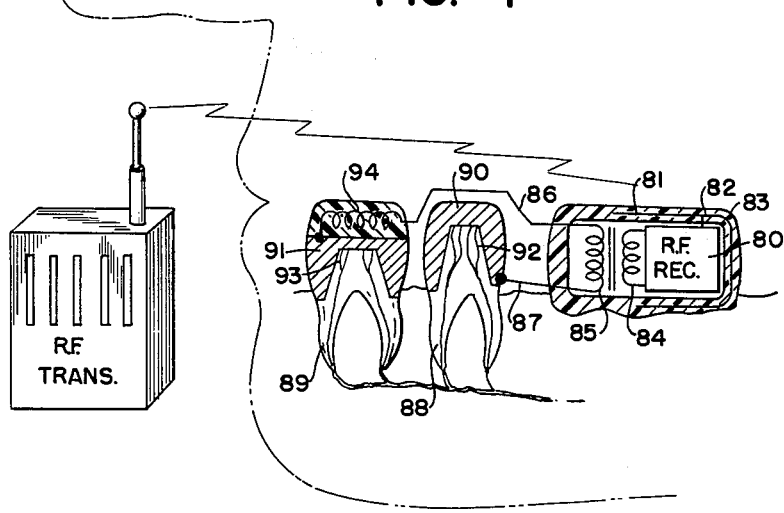
FIGS. 6 and 7 are further modified forms of the new system, in which circuit coupling appliances are mounted on two viable teeth of the user.

The system of FIG. 7 has substantial similarities to the system of FIG. 6, but incorporates a radio frequency receiver unit provided with a more or less conventional type antenna element. In addition, the system of FIG. 7 is modified slightly to take advantage of a latent capability of aiding the hearing of the subject through bone conduction, as a supplement to the electrically induced hearing derived from the system of FIG. 6. Thus, in the system of FIG. 7, a radio frequency receiver 80 is contained within a non-conducting housing 81 and has an antenna element 82 buried in the interior of the insulating housing 81. The receiver is provided with an output transformer including a primary coil 84 and a secondary coil 85, the latter constituting an isolating inductance in the nerve-activating circuit. The inductance 85 is provided with output connections 86, 87 passing through the walls of the insulating housing 81.

As in the case of the system of FIG. 6, the system of FIG. 7 makes use of a pair of viable teeth 88, 89, which are denuded of their exposed enamel and provided with conductive dental caps 90, 91 to establish a capacitative coupling with the nerve endings 92, 93 of the teeth. In the system of FIG. 6, the conductive cap 90 is connected directly to the output connection 87 of the inductance 85, while the second conductive cap 91 is connected to the output connection 86 through a magnetic coil transducer 94, which is fixed to the tooth 89, advantageously as part of the cap structure. The magnetic coil transducer 94 is designed, using conventional principles, to impart to the tooth a mechanical, vibratory motion corresponding to the electrical signals impressed upon the transducer coils. The mechanical vibrations thus induced in the tooth are transmitted in a well-known manner through the bone structure of the subject to the electromechanical ear mechanisms to induce sensations of hearing.

It should be understood that the bone conduction induced through the use of the transducer 92 is supplemental and secondary to that induced by imparting modulated electrical signals to the facial nerve system of the subject. In this respect, it has been shown that when an intra-oral radio receiver with a transducer (speaker) output is placed in the mouth (and the system is electrically insulated from the body) the sensation of hearing does not result. Thus a straight bone conductor in the mouth does not function as an aid to hearing unless its output is electrically coupled to the facial nerve system.

As will be understood, the circuit operation of the system of FIG. 7, insofar as it operates to impress the desired, modulated signal upon the facial nerve system, is substantially the same as the system of FIG. 6, the isolating inductance 85 of the receiver output being capacitatively coupled at both sides to the active section of the nerve system of the subject. The specific system illustrated in FIG. 7 utilizes a separate antenna element 82 for the radio frequency receiver 80, but it will be understood that the system may be operated without the separate antenna, substantially as described in connection with the system of FIG. 6.

The circuit equivalent representation of the system of FIG. 7 is substantially that indicated in FIG. 8, the magnetic coil transducer being omitted in view of its essentially mechanical involvement insofar as the subject is concerned. In the system of FIG. 7, the output leads 86 and 87 can be connected to the teeth in either a series or a parallel connection.

While the systems of FIGS. 5–7 involve the utilization of viable teeth of the subject, the invention is not intended to be limited to use by subjects having viable teeth. Thus, in the system of FIG. 9 provision is made for the use of intraoral appliances by edentulous subjects. The system of FIG. 9 includes a radio frequency receiver 100 encased in a non-conductive housing 101 which forms part of the structure of a set of dentures designated generally by the numeral 102. In the illustrated arrangement, the receiver 100 has an antenna element 103 distributed within the housing in insulated relation and is provided also with an output transformer including a primary coil 104 and a secondary coil 105, the latter constituting an isolating inductance in the nerve activating circuit, as previously described.

Advantageously mounted adjacent the receiver housing 101 and forming part of the denture structure is a false tooth unit 106, comprising a dental cap 107, formed of conductive material and mounted on a supporting stub 108 of a suitable dielectric material. Embedded within the stub is a magnetic coil transducer element 109 having a vibrating plate 114. A protruding, flat-plate end 110 is adapted to establish electrical contact with the gum tissue of the subject when the denture structure is operatively placed in the mouth of the subject.

The dental cap 107 is coupled directly to one terminal of the isolating inductance, by means of its output connection 111, establishing a capacitative coupling between the inductance and the contact point 110 through the Leyden jar configuration of the false tooth 106, and the magnetic coil transducer element 109.

In accordance with the invention, a desirable, capacitative coupling between the subject and the other terminal of the inductance 105 is established by means of a contact element 112 formed of piezoelectric material and connected at one end to the inductance. The contact element passes through the base of the housing in insulated relation and has an exposed contact plate 112 adapted to establish electrical contact with the gum tissue of the subject when the denture structure is in operative position, as indicated in FIG. 9.

In the operation of the system of FIG. 9, the piezoelectric contact element 112 is distorted by the application of a signal voltage thereto, to provide a desirable, fricative stimulation of the gum tissue for improved receptivity of the nerve receptors to the applied signals.

Moreover, if appropriate, the plate element 110 of the tooth structure 106 may be formed of piezoelectric material to provide fricative stimulation of the gum tissue through the exposed surface of the element 110.

FIG. 10 illustrates schematically the circuit equivalent arrangements of the system of FIG. 9. The circuit includes the receiver output transformer comprising primary and secondary coils 104, 105, capacitative couplings C5, C6, and a nerve "circuit" N, comprising elements of resistance R, inductance L, and rectification D and being grounded to the body at G. As will be observed the basic circuit equivalent arrangement of FIG. 10 is fundamentally similar to that of FIGS. 3 and 8.

The various systems of the present invention, while employing fundamental aspects of our prior Patent No. 2,995,633, incorporate significant new discoveries, resulting in improved and more reliable performance and capable of widespread practical application. Specifically, the basic concept of establishing a capacitative coupling between the selected nerve circuit of the facial nerve system and the opposite terminals of a receiver output inductance, appears to render the nerve system significantly more sensitive or receptive to the applied signals. One possible explanation of this advantageous phenomenon is that the complete circuit, including an isolating inductance, capacitative couplings, and nerve section, forms a desirable pulse forming network, whereby signal pulses of a particularly desirable form are imparted to the selected nerve section. It is recognized, however, that the systems of the body are very complex and not fully understood, and our explanations of the results achieved should be considered as tentative.

It should be understood that the specific forms of the invention herein illustrated and described are intended to be representative only, since certain changes may be made therein without departing from the clear teachings of the disclosure. Accordingly, reference should be made to the following appended claims in determining the full scope of the invention.

We claim:

1. Means for aiding hearing by imparting modulated electrical signals to viable nerves of the facial system of a subject, comprising a radio frequency receiver for receiving transmitted signals corresponding to audible sounds, said receiver having an output circuit, said output circuit having output terminals presenting modulated electrical signals corresponding to said audible sounds, first circuit means including a first capacitative coupling for connecting one terminal of said output in circuit with viable nerves of the facial system of the subject, and second circuit means including a second capacitative coupling for connecting the other terminal of said output in circuit with said viable nerves.

2. The means of claim 1, which includes detection means in association with one of said circuit means, said detection means being so oriented relative to the section of said viable nerves in circuit association with said circuit means that the outer portion of said nerve section is negative relative to the inner portion of said nerve section.

3. The means of claim 1, for use by a substantially edentulous subject, which includes a denture structure housing said radio frequency receiver and said first and second circuit means, said denture structure being adapted for reception about edentulous regions of the subject's oral cavity including said first and second predetermined areas, and said denture structure having first and second contact elements associated with and forming terminals of said first and second circuit means, said contact elements being mounted in exposed relation for establishing electrical communication with said first and second predetermined areas upon operative positioning of said denture structure within the oral cavity.

4. The means of claim 3, in which at least one of said contact elements comprises an element of piezoelectric material.

5. The means of claim 3, in which at least one of said capacitative couplings comprises a false tooth structure including a cup-shaped cap, said output circuit includes an isolating inductance, and a magnetic coil element is housed within said false tooth structure and connected between said isolating inductance and the contact element associated with said false tooth structure.

6. Means for aiding hearing by imparting modulated electrical signals to viable nerves of the facial system of a subject, comprising a radio frequency receiver for receiving transmitted signals corresponding to audible sounds, said receiver having an output circuit, said output circuit having output terminals presenting modulated electrical signals corresponding to said audible sounds, first circuit means including a capacitative coupling for effectively connecting one terminal of said output circuit to the body of the subject, and second circuit means, including a movable conductive element coupled to the other terminal of said output circuit, for effectively connecting the other terminal of the output circuit to viable nerves of the facial system of the subject, said movable conductive element being adapted for motion relative to body surface areas of the subject innervated by the facial nerve system.

7. The means of claim 6, in which said movable conductive element is a piezoelectrical element having a portion mounted in physical contact with one of the body surface areas.

8. The means of claim 6, in which at least one of said circuit means includes a variable capacitative coupling.

9. The means of claim 6, in which said first and second circuit means include capacitative coupling means.

10. The means of claim 6, which includes a housing adapted for mounting adjacent one of the body surface areas, said first circuit means includes a terminal conductor mounted by said housing and held thereby in electrically coupled relation with the body of the subject, and said movable conductive element comprises a piezoelectrical element anchored by said housing and having a movable and electrically energized portion in electrical and physical contact with the body surface areas, said piezoelectrical element being energized by said modulated electrical signals.

11. The means of claim 10, in which said first circuit means includes variable capacitative coupling means.

12. Means for aiding hearing by imparting modulated electrical signals to viable nerves of the facial system of the subject, comprising a radio frequency receiver for receiving transmitted signals corresponding to audible sounds, said receiver having an output circuit, said output circuit having output terminals presenting modulated electrical signals corresponding to said audible sounds, first circuit means including a first capacitative coupling for coupling one terminal of said output circuit to endings of viable nerves of the facial system in a tooth of the subject, and second circuit means including a second capacitative coupling for connecting the other terminal of said output circuit to a predetermined region of said viable nerves.

13. The means of claim 12, in which said first capacitative coupling comprises a cup-shaped conductive cap mounted on said tooth.

14. The means of claim 12, which includes means for detecting said modulated signal, whereby the signal applied to said nerve endings is negative with respect to said predetermined region of said viable nerves.

15. The means of claim 12, in which said second circuit means comprises a plate-like element in surface contact with the facial area of the subject and maintained in electrical contact with said predetermined region of said viable nerves, and said second capacitative coupling includes said plate-like element.

16. The means of claim 15, in which said first capacitative coupling comprises a cup-shaped conductive element connected to said one terminal of said output circuit and positioned in generally surrounding relation to said nerve endings.

17. Means for aiding hearing by imparting modulated electrical signals to viable nerves of the facial system of a subject, comprising a radio frequency receiver for receiving transmitted signals corresponding to audible sounds, said receiver having an output circuit, said output circuit having output terminals presenting modulated electrical signals corresponding to said audible sounds, first capacitative coupling means for connecting one terminal of said output circuit to free endings of viable nerves of the facial system in a first tooth of the subject, and second capacitative coupling means for connecting the other terminal of said output circuit to free endings of viable nerves of the facial system in a second tooth of the subject.

18. The means of claim 17, in which said first and second capacitative coupling means comprise cup-shaped caps mounted on said first and second teeth.

19. The means of claim 17, which includes electro-mechanical transducer means mechanically coupled to one of said teeth and operative to effect mechanical stimulation of said tooth corresponding to electrical excitation of the free nerve endings thereof.

20. The means of claim 17, in which said ratio frequency receiver comprises receiver circuit means, a dental bridge encapsulating said receiver circuit means and adapted for reception and mounting within the oral cavity of the subject, and insulated output circuit connections extending from said dental bridge for connection with said first and second capacitative couplings.

21. The means of claim 20, in which said dental bridge comprises a conductive housing forming a shielded enclosure for said receiver circuit means.

22. The means of claim 20, in which said dental bridge comprises a non-conductive housing, and said receiver circuit means includes an antenna element distributed through said housing in insulated relation to the oral cavity.

23. Means for aiding hearing by imparting modulated electrical signals to viable nerves of the facial system of a subject, comprising a radio frequency receiver for receiving transmitted signals corresponding to audible sounds, said receiver having an output circuit, said output circuit having output terminals presenting modulated electrical signals corresponding to said audible sounds, first circuit means including a first capacitative coupling for connecting one terminal of said output circuit to a first predetermined area of the gum tissue of the subject, and second circuit means including a second capacitative coupling for connecting the other terminal of said output circuit to a second predetermined area of the gum tissue of the subject.

24. Means for aiding hearing by imparting modulated electrical signals to viable nerves of the facial system of a subject, comprising a radio frequency receiver for receiving transmitted signals corresponding to audible sounds, said receiver having an output circuit including an isolating inductance, first circuit means including a first capacitative coupling for connecting one terminal of said inductance to viable nerves of the facial system of a subject, and second circuit means including a second capacitative coupling for connecting the other terminal of said inductance to said viable nerves.

No references cited.